L. MAU.
ADJUSTABLE BALL BEARING.
APPLICATION FILED APR. 22, 1909.

951,194.

Patented Mar. 8, 1910.

Witnesses
Theo. Rosenand.
J. A. L. Mulhall.

Inventor
Louis Mau,
By Joshua R. H. Potts.
Attorney

UNITED STATES PATENT OFFICE.

LOUIS MAU, OF PHILADELPHIA, PENNSYLVANIA.

ADJUSTABLE BALL-BEARING.

951,194.  Specification of Letters Patent.  Patented Mar. 8, 1910.

Application filed April 22, 1909. Serial No. 491,422.

*To all whom it may concern:*

Be it known that I, LOUIS MAU, a citizen of the United States, residing at Philadelphia, in the county of Philadelphia and State of Pennsylvania, have invented certain new and useful Improvements in Adjustable Ball-Bearings, of which the following is a specification.

My invention relates to an improved adjustable ball-bearing, the object of the invention being to provide a ball-bearing, of extremely simple and inexpensive construction, which can be readily and quickly adjusted, by any one of average intelligence, to take up, or compensate for wear, upon the balls or the bearings.

With these and other objects in view, the invention consists in certain novel features of construction, and combinations and arrangements of parts, as will be more fully hereinafter described and pointed out in the claim.

Figure 1:
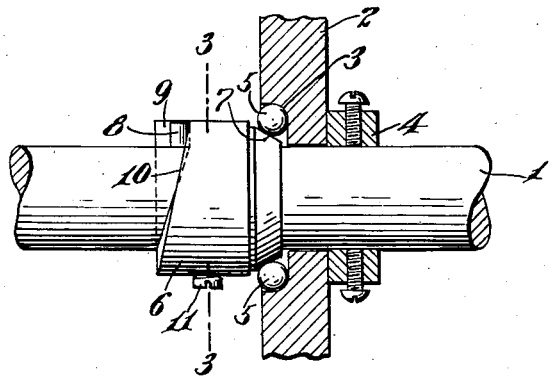
Figure 2:
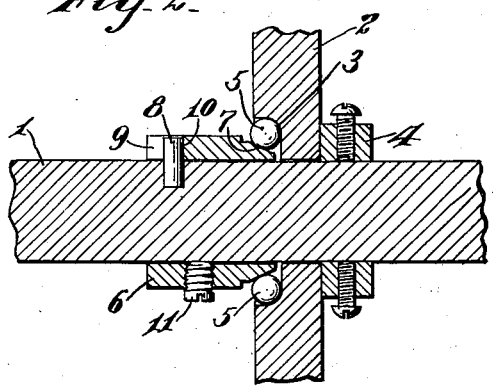
Figure 3:
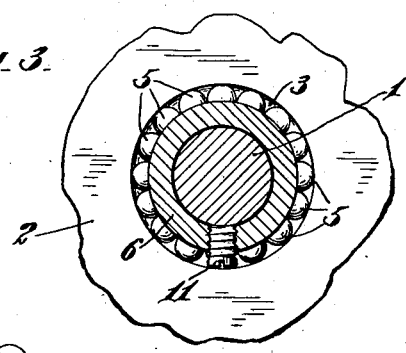

In the accompanying drawings, Figure 1, is a view partly in elevation and partly in longitudinal section illustrating my improvements. Fig. 2, is a view in longitudinal section, and Fig. 3, is a view in cross section on line 3—3 of Fig. 1.

1 represents a shaft about which a member 2 is adapted to rotate, and held against movement in one direction on the shaft by a collar 4. This bearing member 2 is provided with a run-way 3 for balls 5, and 6 is my improved adjustable bearing member, which is also provided with a run-way 7 for the balls 5.

A pin 8 fixed to shaft 1 is located in a recess 9 in the end of member 6, which latter is in the form of a sleeve supported on the shaft, and one wall of this recess 9 forms a cam 10 positioned against the pin 8, so that when member 6 is turned in one direction, the action of the cam wall 10, against pin 8, will move the member 2 longitudinally toward the balls 5, and take up or compensate for wear.

A set screw 11 is mounted in member 6 and engages the shaft 1 to lock the member 2 at any desired adjustment. When it is desired to adjust the bearing, this screw 11 is loosened, and the member 6 given a partial rotary movement on shaft 1 until it engages the balls 5 with sufficient pressure, so as to form a perfectly running ball-bearing. The screw 11 can then be screwed home and the device will be ready for further use, and the bearing will be as effectual as when new.

Various slight changes might be made in the general form and arrangement of parts described without departing from my invention, and hence I do not restrict myself to the precise details set forth, but consider myself at liberty to make such changes and alterations as fairly fall within the spirit and scope of the claim.

Having thus described my invention what I claim as new and desire to secure by Letters Patent is:

In a device of the character described, the combination with a shaft, of a device around the shaft and mounted to turn thereon, a collar secured around said shaft back of said device for preventing movement of said device longitudinally of the shaft, and said device having a ball run-way in its face opposite the collar, of a sleeve having a smooth bore mounted on said shaft and having a ball run-way at one end, balls between the run-ways of said sleeve and said first mentioned device, said sleeve having a recess in its end farthest from the balls, forming a cam wall, a pin fixed in the shaft and positioned against the cam wall, whereby when said sleeve is turned, the action of the cam wall at the end of the sleeve against said fixed pin will cause the sleeve to move longitudinally, said sleeve having a screw threaded opening, and a screw in said opening engaging the shaft and locking the sleeve against movement.

In testimony whereof I have signed my name to this specification in the presence of two subscribing witnesses.

LOUIS MAU.

Witnesses:
R. H. KRENKEL,
J. A. L. MULHALL.